United States Patent [19]
Heming et al.

[11] Patent Number: 5,480,687
[45] Date of Patent: Jan. 2, 1996

[54] OPTICAL WAVEGUIDE WITH A SUBSTANTIALLY PLANAR SUBSTRATE AND PROCESS FOR ITS PRODUCTION

[75] Inventors: Martin Heming, Saulheim; Roland Hochhaus, Mainz; Ralf Kersten, Bremthal; Dieter Krause, Mainz; Jürgen Otto, Mainz; Volker Paquet, Mainz; Johannes Segner, Stromberg, all of Germany; Christof Fattinger, Blauen, Switzerland

[73] Assignees: Schott Glaswerke, Mainz, Germany; Hoffmann-La Roche, A.G., Basel, Switzerland

[21] Appl. No.: 418,895

[22] Filed: Apr. 7, 1995

Related U.S. Application Data

[60] Continuation of Ser. No. 102,177, Aug. 4, 1993, which is a division of Ser. No. 946,072, Sep. 18, 1992, Pat. No. 5,369,722.

[30] Foreign Application Priority Data

Sep. 18, 1991 [DE] Germany ............................ 41 30 985.5
Apr. 24, 1992 [DE] Germany ............................ 42 13 454.4
Aug. 29, 1992 [DE] Germany ............................ 42 28 853.3

[51] Int. Cl.$^6$ .................................................... B05D 3/06
[52] U.S. Cl. ........................ 427/573; 427/164; 427/579; 427/574; 427/563
[58] Field of Search ..................... 427/562, 563, 427/569, 574, 575, 576, 573, 577, 578, 579, 164, 322

[56] References Cited

U.S. PATENT DOCUMENTS

| | | | |
|---|---|---|---|
| 3,822,928 | 7/1974 | Smolinsky et al. | 350/96 WG |
| 4,712,856 | 12/1987 | Nicia | 350/96.12 |
| 4,749,245 | 6/1988 | Kawatsuki et al. | 350/96.12 |
| 4,784,877 | 11/1988 | Trumble | 427/164 |
| 4,827,870 | 5/1989 | Lee | 427/164 |
| 4,861,128 | 8/1989 | Ishikawa et al. | 350/96.13 |
| 4,955,977 | 9/1990 | Dao et al. | 350/96.34 |
| 5,009,920 | 4/1991 | Lee | 427/164 |
| 5,026,135 | 6/1991 | Booth | 350/96.12 |
| 5,134,681 | 7/1992 | Ratovelomanana et al. | 385/130 |
| 5,138,687 | 8/1992 | Horie et al. | 385/129 |
| 5,258,024 | 11/1993 | Chavel et al. | 427/164 |
| 5,295,220 | 3/1994 | Heming et al. | 427/576 |

FOREIGN PATENT DOCUMENTS

| | | | |
|---|---|---|---|
| 964504 | 3/1975 | Canada | 385/130 |

OTHER PUBLICATIONS

Otto et al., "Radio Frequency and Microwave Plasma for Optical Thin Film", SPIE, vol. 1323, Optical Thin Films III: New Developments, pp. 39–50 (1990), no month.

Kunz et al., "Integrated Optical Sensors Based on Reactive Low Voltage Ion Plated Films", Eurosensors IV, Karlsruhe (Oct. 1–3, 1990).

Titamir, *Topics in Applied Physics*, vol. 7, pp. 90–119, no date given.

Rose, "Inorganic–Organic Polymers as Coating Systems for Improving the Mechanical, Chemical and Physical Properties", Fraunhofer–Institut fuer Silicatforschung, Neunerplatz 2, 8700 Wuerzburg, Germany, no date.

Translation of Rose article, no date.

(List continued on next page.)

*Primary Examiner*—Marianne Padgett
*Attorney, Agent, or Firm*—Millen, White, Zelano & Branigan

[57] ABSTRACT

An optical waveguide is disclosed with a substantially planar substrate and a waveguide layer applied to the substrate. The invention resides in that the substrate consists of a synthetic resin or of a material having a high organic proportion. This has the advantage that the high index of refraction of the inorganic waveguide layer is combined with the material properties of the synthetic resin substrate, such as, for example, breaking resistance, plastic and thermoplastic moldability, photochemical structuring ability, and others.

35 Claims, 2 Drawing Sheets

OTHER PUBLICATIONS

Schmidt, "Chemical of Material Preparation by the Sol–Gel Process", Journal of Non–Crystalline Solids, 100:51–64 (1988), no month.

Schmidt et al., "Development of Organic–Inorganic Hard Coatings by the Sol–Gel Process", *Ultrastructure Processing of Advanced Ceramics*, J. D. MacKenzie et al., eds., John Wiley & Sons, New York, pp. 651–660 (1988), no month.

Schmidt et al., "Hot Melt Adhesives for Glass Containers by the Sol–Gel Process", Journal of Non–Crystalline Solids, 80:557–563 (1986), no month.

Greiwe et al., "ORMOCERe: Eine neue Werkstoffklasse, Erste Produktent–wicklungen", FhG–Berichte, Feb. 1990 (ORMOCERs: A Novel Class of Materials, Initial Product Developments, FhG Reports), in German.

OPTICAL WAVEGUIDE WITH A SUBSTANTIALLY PLANAR SUBSTRATE AND PROCESS FOR ITS PRODUCTION

This application is a continuation of application Ser. No. 08/102,177, filed Aug. 4, 1993, which is a divisional of U.S. Ser. No. 07/946,072, filed Sep. 18, 1992, now U. S. Pat. No. 5,369,725.

BACKGROUND OF THE INVENTION

This invention relates to an optical waveguide having a substantially planar substrate and an inorganic waveguide layer applied to the substrate. The invention also relates to a process for the production of said optical waveguide and to the use of such waveguides.

The application of optical coatings to various substrates is known per se wherein, depending on the intended usage and manner of usage of the coated substrates, the optical quality of the coatings must meet different requirements.

A process for applying multiple-layer optical interference coatings to substrates having a complex surface configuration has been known from DOS 3,833,501. Thus, several hundred layers are applied to a polymer substrate by plasma-enhanced chemical vapor deposition wherein organometallic compounds are utilized for the coating. The coating method yields interference layers of a material with a relatively high organic proportion whereby high flexibility is ensured in the selection of the material for the coating step. The quality of the coating, especially, with respect to the microstructure is not of decisive importance for the purpose for which such substrates provided with several interference layers are employed, such as, for example, in helmet visors for helicopter pilots. It is true that mention is made of the fact that the coating does not exhibit the usually present micro-column structure, although this is demonstrated only for coatings of glass substrates. Besides, the lack of a micro-column structure can supposedly be traced back to the relatively high organic proportion of the coating. There is no suggestion in DOS 3,833,501 involving the production of optical waveguides with essentially planar substrates.

DOS 4,008,405.1 likewise lacks any hint with regard to optical waveguides with essentially planar substrates. Although the reference mentions coating synthetic resin substrates with interference layers to form reflectors, it is expressly pointed out that plastic substrates due to their low thermal stress-bearing capacity are less well suited than inorganic substrates, such as glass substrates, for example.

In contrast to reflectors or substrates generally equipped with interference layers, the requirements to be met by optical waveguides utilized, for example, as optical transducers in surface sensors, e.g., biosensors, are far higher. In particular, optical waveguides are desired which exhibit minimum attenuation and high refractive index. Such waveguides are known per se, but in each case glass substrates are utilized provided with inorganic or organic coatings. The low attenuation of these conventional waveguides is made possible by the fact that the inorganic substrate, such as glass, for example, can be heated to a high temperature so that the formation of a micro-column structure is extensively precluded.

An optical planar waveguide has been known from Kunz et al. in "Eurosensors" IV, 1990, Karlsruhe, which is produced with a reactive ion plating from $Ta_2O_5$ and exhibits a refractive index of 2.2 at a loss of 1.1 dB/cm for the TE0 mode and 1.3 dB/cm for the TM0 mode. The effect of the substrate material on the losses at a wavelength of 633 nm is disclosed wherein layers of quartz glass have the lowest losses. When using this substrate, the losses are low (<4 dB/cm) at low arc current, but the layer has a pronounced columnar structure rendering the layer dependent on environmental conditions. In order to obtain dense layers, the arc current must be brought to a high level, but this has the drawback that the losses are increased.

Lam, D. K. W., Appl. Opt. 23/1984/2744 discloses the production of an $SiO_xN_y$ waveguide at a substrate temperature of 220° C. on quartz glass or silicon. Low losses of $SiO_xN_y$ are obtained only for a refractive index of about 1.75, namely after an additional process step compatible only for inorganic substrates. This involves an additional $CO_2$ laser treatment during which the loss of 5 dB/cm is reduced to 1.5 dB/cm.

Application possibilities are described in Lukosz, W., et al., "Sensors and Actuators", B1 (1990): 585–588 and 592–596 for a waveguide produced by the sol-gel technique and having a thickness of about 170 nm, made up of an $SiO_2$—$TiO_2$ mixed layer on glass with a refractive index of 1.74–1.80. The gel layer can be embossed so that a grating can be applied. However, after embossing the gel layer must be hardened with the disadvantage that the gel layer shrinks and thus its optical properties are altered. Pure $TiO_2$ layers with a high index of refraction cannot be produced since the hardening process requires temperatures so high that the layers become crystalline.

In Heuberger et al., Appl. Opt. 25/1986/1499, waveguides are described which are likewise produced by the sol-gel technique. The thus-applied $SiO_2$—$TiO_2$ mixed layer on "Pyrex" glass has a loss of <1 dB/cm, but must likewise be cured at high temperatures (500° C.).

In all publications concerning optical waveguides, the production of $SiO_xN_y$, $Ta_2O_5$ or $SiO_2$—$TiO_2$ layers is described, in each case on inorganic substrates, wherein either high substrate temperatures must be employed, or an additional treatment must be performed.

A further disadvantage of the conventional waveguides resides in that their substrates proper cannot be embossed which, however, is necessary, for example, for the economical application of an optical grating for the coupling in or coupling out of light as regards the waveguide layer. Moreover, the known optical waveguides are fragile and cannot be processed by cutting or punching.

U.S. Pat. No. 4,749,245 discloses an optical waveguide on a planar substrate comprising an organic waveguide layer and a substrate of a synthetic resin. At least one intermediate layer of a further organic high-molecular material is required between the substrate and the waveguide layer; the solubility of this intermediate layer is different from that of the waveguide organic material and its refractive index is lower. One drawback of this waveguide resides in that only a restricted refractive index range is available for the waveguide layer (maximally up to 1.7), and that the waveguide layer is not stable with respect to its index of refraction under varying environmental conditions (moisture, temperature) since synthetic resins normally absorb moisture. Therefore, waveguides of the disclosed type are unsuitable for surface sensor technology [see, for example, R. Reuter et al., APL 52, p. 778 (1988)].

SUMMARY OF THE INVENTION

An object of the invention is to provide a high-refractive index optical waveguide with an essentially planar substrate exhibiting high breaking strength.

A further object is to provide a substrate which is suitable for the economical production of optical microstructures, permitting simple and economical further processing of the waveguide into finished products.

Still further objects relate to the production and use of such waveguides.

Upon further study of the specification and appended claims, further objects and advantages of this invention will become apparent to those skilled in the art.

To attain these objects, there is provided an optical waveguide with a substantially planar substrate and an inorganic waveguide layer applied to the substrate, characterized in that the substrate (1) consists of a synthetic resin or of a material having a high organic portion proportion.

To produce the waveguides, there is provided a process for the production of optical waveguides wherein a waveguiding inorganic layer is applied to a substantially planar substrate, wherein a synthetic resin substrate or a substrate having a high organic proportion is used as the substrate, the synthetic resin being heated to a temperature of $T<T_g$ ($T_g$=glass transition temperature) and the substrate having a high organic proportion to a temperature of $T<300°$ C., and an inorganic waveguide layer is applied to the substrate by means of a plasma chemical vapor deposition (PCVD) process.

The waveguides have a variety of conventional uses, e.g., as an optical transducer, especially a surface sensor; a component of an optical measuring device; and a component of an optical network.

The expression "high organic proportion" is understood to mean a proportion of the number of hydrocarbon groups to metallic atoms of the oxide of larger than 0.1. The hydrocarbon group is generally an alkyl group such as, for example, a lower hydrocarbon, e.g., methyl ($CH_3$—), ($C_2H_5$—), and the like. Thus, for example, k ($CH_3$—)/k (metallic atom) is larger than 0.1 where k represents the concentration.

The optical waveguide according to this invention with an inorganic waveguide layer on a synthetic resin substrate offers the advantage that the high index of refraction of the inorganic-layer is combined with the material properties of the synthetic resin substrate, such as, for example, breaking strength and low weight as well as an economically favorable structuring ability. The layer thickness required for conducting a certain number of modes becomes the smaller, the higher the index of refraction of the waveguide. Monomode waveguides with high refractive index of the inorganic waveguiding layer, conducting only the TE0 and TM0 modes, are of significance, in particular, when using the waveguide in sensor technology (especially surface sensor technique) since the sensitivity of the sensor rises with the refractive index.

Additional advantages of inorganic waveguide layers on plastic substrates reside in that the plastic substrate can be fashioned as a film. Films having thicknesses of >20 μm are coated without problems with waveguide layers without this representing a lower limit. The material of a synthetic resin film offers the advantage that waveguides can be manufactured in larger piece numbers and can be made accessible to wide usage as a mass-produced article. The material properties of the plastic film simplify the subsequent processing of the waveguide into finished products considerably.

Preferably, synthetic resins that can be processed by the thermoplastic method are utilized as the substrate material, especially thermoplastically workable polycarbonate, polymethylmethacrylate (PMMA), polyimide or polyester.

Thermoplastics have the advantage that it is possible to produce on their surfaces, by means of hot stamping, optical diffraction gratings for the coupling in and coupling out of the guided wave, without great manufacturing costs.

Polycarbonates are preferred since they yield films having a good surface quality, i.e., a relatively low surface roughness. Moreover, hot stamping of optical gratings onto polycarbonate has already been well proven by experiments. Also, polycarbonate is known as a substrate for organic waveguide layers. However, polycarbonate substrates have the drawback that they are very sensitive to scratching. Polycarbonates have a good temperature stability; the maximum long-term usage temperature is approximately 135° C.

PMMA is highly scratch-resistant, exhibits an only low water absorption capacity, but is not as temperature-stable as polycarbonate. The maximum long-term usage temperature of PMMA is merely 60°–90° C. whereby the coating temperature for the waveguide is greatly limited. In general, higher indices of refraction are attained with higher substrate temperatures during the production of the inorganic waveguide layer. In contrast thereto, PMMA, just like polycarbonate, can be readily stamped and moreover can also be subjected to photo-texturing.

Polyimide substrates have the advantage that, on account of the comparatively low thermal expansion of this plastic, stresses between the substrate and the inorganic coating are lower than in other plastics. Moreover, it is also possible to provide polyimide substrates with optical diffraction gratings by means of hot stamping or photo-texturing. The long-term usage temperature of polyimide is, with above 200° C., even markedly higher than that of polycarbonate. Therefore, polyimide substrates permit high coating temperatures and thus provide waveguides having high indices of refraction.

Inorganic layers show very good adhesion to polyester substrates. Moreover, polyester substrates are likewise highly temperature-stable (long-term usage temperatures of 100°–120° C., for short periods even up to 200° C.) and can be readily stamped.

Further suitable synthetic resins are, inter alia, polyvinyl chloride (PVC) (long-term usage temperature 65°–85° C.) and polystyrene (long-term usage temperature 50°–70° C.), likewise lending themselves to the hot stamping technique, as well as CR 39 (allyldiglycolcarbonate), polyurethane or a polymer of diethylene glycol bisallyl carbonate.

Synthetic resin films are preferably utilized as the substrate material. Plastic films, employed as an endless tape, can be provided with optical gratings in a continuous rolling stamping process. An alternative method for grating production on the substrate surface is the embossing of plastic panels with a planar die. Individual sensor chips can be readily punched out from the plastic film or panel coated with the waveguide (e.g., for use as optical transducers in sensor technology).

In place of a purely organic substrate, it is also possible to use substrates having a high organic proportion. Suitable for this purpose are the so-called ORMOCER materials, Organically Modified Ceramics— for example, Greuer K., and Schother, G., ORMOCERs: "A Novel Class of Materials, First Product Development", FhG-Berichte 2 (1990). These ORMOCER materials as well as also plastic layers produced from the liquid phase, e.g., of non-thermoplastic polyimides, can be embossed in the uncured condition so that a coupling-in grating or coupling-out grating can be formed without any great manufacturing expense.

Preferably, these ORMOCER layers, or also the plastic layers produced from the liquid phase, are applied to a further backing plate or film of an inorganic or organic material. This has the advantage that, on the one hand, due to the surface tension of the coating solution an optically high-quality surface with low roughness can be produced in a simple way, while, on the other hand, when using inorganic backing materials, the lateral thermal expansion coefficient of the backing plate or backing film coated with ORMOCER or synthetic resin can be optimally adapted to the thermal expansion coefficient of the waveguide layer [see, in this connection, for example, G. Elsner et al., Thin Solid Films, 1985 (1990):189–197; T. Oguchi et al., Electronics Letters, 27 (1991):706–707].

Synthetic resins exhibit a substantially higher thermal expansion coefficient than inorganic materials, such as, for example, glass, $SiO_2$, $TiO_2$, and others. When coating organic substrates with an inorganic layer, the differing thermal expansion co-efficient can lead, in case of a temperature change, to crack formation in the waveguide layer. However, when applying thin organic substrate layers (several μm) to a glass backing plate, for example, then an anisotropic thermal expansion coefficient evolves. In the plane, the synthetic resin assumes a value similar to that of the backing material whereas perpendicularly thereto an expansion coefficient is observed similar to that of the synthetic resin material. The entire system thus exhibits, in the lateral direction, an expansion coefficient similar to the backing material which usually is adapted to a substantially higher degree to that of the waveguide layer. The crack formation tendency is thus reduced.

However, also when using thermoplastic or photo-texturable substrates it may be advantageous to apply these likewise to a further backing plate or film of the above-described type, for example, by providing a coating solution thereon by drawing-down or centrifugal methods. Suitable coating solutions are thermoplastic polyimides in solution, or photoresist based on polyimides. This feature offers the aforementioned advantages of simplified manufacture of optically high-quality surfaces with low roughness and with an adapted thermal expansion of backing plate or, respectively, backing film, and the waveguide layer. The optical diffraction grating or the optical microstructure (for producing a strip-type waveguide) in the substrate layer on the backing plate or backing film can be produced by embossing or photo-texturing.

Plates of an inorganic material are preferably of glass, such as, for example, lime-soda glass or quartz glass. However, metallic plates can also be utilized.

The layer thickness of the substrate should range between 20 μm and 2 mm, preferably less than 500 μm. Thus, the substrate can be readily handled and. can be punched out in a simple way as well, for the production of sensor chips. If the substrate is applied to a backing film or plate, the layer thickness should be between 0.1 and 50 μm, preferably between 0.5 and 20 μm.

Such layers have a thickness sufficient for stamping an optical grating; on the other hand, the upper limit for the layer thickness, established for reasons of coating technique, is not as yet attained.

The waveguide according to this invention exhibits a substantially planar substrate. "Substantially planar" along the lines of this invention means that the substrate can definitely be slightly uneven, i.e., for example, slightly curved.

Preferably, the inorganic waveguide layer consists of $TiO_2$, a $TiO_2$—$SiO_2$ mixture, of ZnO, $Nb_2O_5$, $Si_3N_4$, $Ta_2O_5$, $HfO_2$ or $ZrO_2$. The use of these materials for the production of highly refractive waveguide layers is conventional. In particular, known coating methods can be utilized, such as, for example, the PCVD, PICVD or ion-enhanced PVD process. Waveguide layers of $SiO_2$, $TiO_2$ or $Si_3N_4$ are especially preferred since these coatings can be prepared in a simple way by means of a PCVD or plasma impulse chemical vapor deposition (PICVD) method, and the starting materials for these compounds are very inexpensive.

The attenuation of the optical waveguide according to this invention is typically below 10 dB/cm. Preferably, the attenuation is <5 dB/cm, especially smaller than 3 dB/cm. These values result from the requirement that the propagation path of the guided wave in the waveguide is dimensioned to be relatively short for applications of the waveguide as an optical transducer in surface sensor technology; typically, this path is shorter than 1 cm.

For coupling coherent light into and/or out of the laminated waveguide, it is known to use one or several so-called optical diffraction gratings. The optical diffraction grating can extend over limited regions of the backing substrate as well as solidly over the entire substrate surface. The solid-surface design of the diffraction grating has the advantage that expensive adjustment is eliminated when the light is coupled in or out.

Grating structures of this usage are preferably within a range from 500–5000, preferably 1000–5000 lines/mm with structure, depths of 1 to about 50 nm, even more preferably 2 to 20 nm or 2–10 nm.

The optical diffraction grating can be designed as a micro-relief grating as well as a refractive-index grating, i.e., as a continuous layer with a periodically changing index of refraction.

It is advantageous to fashion the optical diffraction grating as a multidiffractive, especially bidiffractive grating, particularly when using a waveguide according to this invention as an optical transducer for a surface sensor, especially biosensor. Bidiffractive gratings as the coupling-in and coupling-out means for optical waveguides are known and are described in EP-A 455,067. A grating structure is called "bidiffractive" if its frequency spectrum exhibits two (multidiffractive grating: several) fundamental components. A bidiffractive grating effects directional separation between coupled-out light and reflected, transmitted, respectively directly diffracted component beams. This makes it possible to detect light conducted in the waveguide layer after the coupling-out step without a background, although the regions on the waveguide layer wherein coupling in and coupling out of the conducted lightwave take place are partially overlapping.

The bidiffractive grating structure is realized by superposition of two gratings having differing periodicity and/or orientation. Details regarding the production and additional advantages of the "bidiffractive grating coupler" are disclosed in EP-A 455,067.

In another preferred embodiment of the invention, the provision is made to arrange at least one intermediate layer between the substrate and the waveguide layer.

The intermediate layer serves, inter alia, for improving the substrate surface with regard to its roughness. Commercially obtainable thermoplastic synthetic resin plates or films exhibit too high a surface roughness for usage, on account of their manufacturing process (typically 3–10 nm, RMS value). This roughness brings about great scattering losses of the conducted modes. The surface roughness of the substrate enters the attenuation as a square. However, roughnesses of <3 nm, preferably <1.5 nm, are necessary to minimize roughness-induced scattering losses in highly refractive, monomode waveguides as they are preferred, for example, for use as optical transducers in surface sensors, particularly biosensors. The intermediate layer preferably exhibits a surface roughness of <3 nm, more preferably <1.5 nm. ("RMS" is an abbreviation for "root meansquare".)

Advantageously, the intermediate layer, with an optical diffraction grating embossed into the substrate surface, does not image the grating structure on its surface in a proportion of 1:1 but rather reduces its modulation depth whereby a defined weakening of the diffraction efficiency and the coupling-in and coupling-out efficiency of the grating structure is obtained. This has technical advantages particularly in the hot stamping of the optical grating during its manufacture.

In the hot stamping of a synthetic resin panel or film, a metallic die is customarily produced from a master by electroplating. The synthetic resin plate or film is heated to a temperature which is at least the glass transition temperature of the synthetic resin and is pressed under moderate pressure against the metal die. The method can also be carried out fully continuously in a roller embossing procedure wherein, by electroplating, a metal shim is produced which is clamped onto a heatable roll. The film is then heated to a temperature above its Tg temperature, and drawn under pressure through two rolls, one of these being provided with the clamped-on textured metal shim. Roll embossings over widths of 300 mm and more pertain to the state of the art. The structuring depths utilized for the usual applications, such as, for example, for producing holographic safety elements or for manufacturing of so-called prismatic films for gift wrapping, are in a range of about 100 nm and thereabove. However, for the coupling in and coupling out of light, respectively, gratings are needed having markedly smaller texturing depths (<50 nm) whereby higher requirements must be met in the production of a master. The structural depth tolerance should here amount to maximally ±20°, preferably merely ±5%. The application of an intermediate layer reducing the grating depth by a desired extent has the advantage that metal shims having the usual texturing depths (around 100 nm) and thus a larger structural depth tolerance can be utilized also for the production of fine optical diffraction gratings.

The furrows of the grating are filled up, following the embossing process, by means of the intermediate layer in a simple way to such a degree that a desired diffraction and/or coupling-in and coupling-out efficiency of the grating is achieved. When using metal shims with texturing depths around 100 nm, it will be sufficient for this purpose normally for the thickness of the intermediate layer to be at least 0.1 times and at most 50 times the depth of the embossed grating structure.

It is furthermore known that the quality of embossing shims is diminished in the course of time especially by abrasion. This leads to a greater roughness of the embossed substrate surface and consequently to an increase in attenuation in the waveguide layer. The application of an intermediate layer here has the additional advantage that it is possible not only to smooth out again the surface roughnesses produced by worn-down stamping shims, but also to readjust in a simple way, via the thickness of the intermediate layer, the structural depth of the stamped grating and thus the diffraction efficiency and the coupling-in and coupling-out efficacy of the grating. These reduced demands regarding the quality of the embossing shims manifest themselves in lower manufacturing expenses for a waveguide according to this invention.

With an increasing thickness of the intermediate layer, the substrate surface will be increasingly removed from the region of the transversely damped field of the wave. Due to the fact that the guided wave, with adequate thickness of the intermediate layer, will interact with the substrate surface now merely in its marginal zone, scattering and absorption losses are minimized.

The intermediate layer can be designed as a single layer, but it can also be composed of a pack of layers in which case the designation "thickness of the intermediate layer" is to be understood along the lines of this invention to mean the thickness of the entire layer pack. On account of a simpler manufacture and in order to keep costs at a low level, the formation of the intermediate layer as a single layer is preferred.

A suitable intermediate layer is one which has a low refractive index and exhibits low absorption, and also has a glassy, i.e., noncrystalline structure. This can be a layer of an organic material as well as a layer of an inorganic material. Also, composite materials of inorganic and organic components can be employed. Layer parcels can be made up of inorganic and/or organic individual layers. Preferably, a material is used for the intermediate layer which is suited as a backing for a waveguide layer applied by a vacuum procedure, especially PCVD.

Examples of suitable materials for the intermediate layer are: $SiO_2$, F- or B-doped $SiO_2$, gradient layers of $SiO_xC_yH_z$ wherein the hydrocarbon portion diminishes continuously from the substrate surface, $Al_2O_3$, organically modified ceramic layers (ORMOCERs), and UV-curable varnishes. In a preferred embodiment, the intermediate layer consists of an organic material since organic materials become strong at temperatures lower than in case of inorganic materials.

In another preferred embodiment, the intermediate layer consists of $SiO_2$. This has the advantage that the intermediate layer and the waveguide layer can be applied jointly in a vacuum process.

Advantageously, the refractive index of the material for the intermediate layer is smaller than or equal to that of the substrate material since the sensitivity of the waveguide is determined by the difference in the refractive index between the waveguide layer and the backing. A prerequisite thereof is, however, that the backing is optically active, i.e., exhibits a minimum thickness of about 50 μm. When using $TiO_2$ for the waveguide layer, the intermediate layer should consist of a material having a refractive index of between 1.3 and 1.6.

It is advantageous to arrange an adhesion-promoting layer between two chemically incompatible layers, for example the organic substrate or the organic intermediate layer and the inorganic waveguide layer. This adhesion-promoting layer can consist, in particular, of a material, the thermal expansion coefficient of which lies between those of the materials to be joined whereby adaptation of the layers in thermal expansion characteristic is obtained, thereby already providing for an improved adhesion of the layers. Preferably, graded layers of $SiO_xC_yH_z$ are utilized as the adhesion-promoting layers; here again, as in case of the intermediate layer, the hydrocarbon proportion should diminish continuously from the interface to the organic layer to the interface to the inorganic layer. Thus, x, y, and z of the formula $SiO_xC_yH_z$ vary during deposition:

| at the substrate | at the inorganic layer |
|---|---|
| x: ≈ 1 | ≈ 2 |
| y: ≈ 1 ... 2 | ≈ 0 |
| z: ≈ 2 ... 6 | ≈ 0 |

Moreover, it has been found to be advantageous, especially when using a PCVD process to apply to the organic substrate, or generally to a layer of organic material, a protective layer in order to protect the organic layer from deleterious influences during the subsequent application of the waveguide layer. Depending on the organic material for the backing layer, it may be advantageous to select the protective layer from a material which protects against the attack of energy particles, e.g., ions, radicals, from the plasma of the starting materials for the waveguide layer, e.g., Cl atoms. Suitable for the protective layer are $SiO_2$ or $SiO_xC_yH_z$ compounds. Preferably, the protective layer consists of $SiO_2$. A layer thickness of a few nm, preferably between 1 nm and 200 nm, is adequate. This protective layer is of high strength and low absorption and is designed so that it is not light-scattering at the wavelength of the light for which the waveguide has been designed. When using an $SiO_xC_yH_z$ compound, the protective layer serves simultaneously as the adhesion-promoting layer.

Preferably, the intermediate layer consists of a material which makes the latter suitable to serve as a protective layer as well as an adhesion-promoting layer.

For various applications of the waveguide in sensor technology and analytics, it proves to be advantageous to provide the surface of the waveguide, in defined regions or over its entire surface, with a cover layer of an inorganic or organic material. The cover layer can serve, for example, for providing a sensor surface having specific chemical or physical properties.

Surfaces of the materials $SiO_2$ and polystyrene play a significant part in analytics. Cover layers of $SiO_2$ and polystyrene are suitable for the use of the waveguide according to the invention in surface sensor technology.

For diverse utilizations of surfaces in analytics (especially in affinity chromatography), the use of porous materials with a large internal surface, e.g. porous $SiO_2$, is of decisive importance. The waveguide according to this invention, with a cover layer of porous $SiO_2$, exhibits ideal material properties for use as an optical sensor in the field of analytics (particularly affinity chromatography).

The optical waveguide layer structure on the substrate surface can be fashioned as a planar optical waveguide or as a so-called strip waveguide. Strip waveguides are also called channel waveguides or beamlead waveguides. Various applications of planar waveguides and strip waveguides in optical sensor art are described in Kunz, Proc. SPIE vol. 1587 (1992).

In a planar optical waveguide, the propagation direction of the guided light wave along the substrate surface is freely selectable. The propagation direction of the guided light wave can be controlled, for example, by suitable choice of grating constant and orientation of the coupling grating, as well as by a suitable selection of the direction of the impinging light beam.

In case of the strip waveguide, the wave is guided along predefined tracks on the substrate surface. The propagation direction of the guided light wave in the plane of the substrate surface is defined by the strip-shaped structure of the waveguide. The coupling in of light into a strip waveguide takes place, for example, with a coupling grating. In this connection, the grating constant and orientation of the coupling grating and the direction of the impinging light beam are to be chosen so that the coupled-in-light wave exhibits the predefined propagation direction of the guided light wave in the strip waveguide.

For the production of strip waveguides, the optical waveguide layered pack is to be provided with a strip-shaped optical microstructure. The microstructure can be located on the substrate surface and/or in an intermediate layer between substrate and waveguide layer and/or in the waveguide layer and/or in a cover layer on top of the waveguide layer. The microstructuring can comprise a suitable raised profile and/or a refractive index modulation in parallel to the substrate surface.

In a preferred embodiment of the invention, the production of the strip-shaped microstructures is to be carried out by techniques analogous to those described for the production of optical grating structures for the coupling-in and coupling-out operations.

In another embodiment of the invention, the strip waveguide is produced by structuring a cover layer on top of the waveguide layer. The production and mode of effectiveness of structured cover layers for the definition of strip waveguides are described in the literature; see, for example, S. Valette et al., "Si-Based Integrated Optics Technologies", Solid State Technology, February 1989.

Planar optical waveguides as well as strip waveguides are utilized as transducers in optical sensor technology [see Kunz et al., Proc. SPIE vol. 1587 (1992)].

Another important application of planar optical waveguides and strip waveguides in the field of sensor art and signal processing resides in their usage as passive components in integrated-optical component groups, especially integrated-optical networks.

The process for producing a waveguide according to this invention is characterized in that, as the substrate, a synthetic resin substrate or a substrate is used having a high organic proportion; that the substrate in case of synthetic resins is heated to T<Tg and, in case of substrates having a high organic proportion, to T<300° C., wherein Tg is the glass transition temperature of the synthetic resin; and that an inorganic waveguide layer is applied to the substrate by means of a PCVD process, preferably PICVD process. Preferably, the plasma in this coating method is excited by means of microwaves.

It has been found that, in this process, substrate temperatures of about 60° C. are already enough for applying a layer having a structure devoid of microcolumns. It is possible with this process to attain a high packing density of approximately 1 wherein the layer shows practically the same resistance to environmental influences as the solid layer material and exhibits practically the index of refraction of the solid layer material. Since only a low substrate temperature is required for the formation of low-loss inorganic waveguide layers, it has been possible by means of this process to utilize, for the first time, synthetic resins or materials having a high organic proportion as the substrates for optically waveguiding layers of an inorganic material.

For example, in the parameter field of coating in a microwave plasma, the electron temperature, which amounts to only a few eV, and the self-bias potential between the plasma and the substrate are at a low level. This affords the advantage that the substrate surface and the inorganic layer will not suffer radiation damage by the plasma. The waveguide layer grows in this process homogeneously without a column structure and at high packing density.

Depending on the substrate material, it may be advantageous to still further enhance the adhesion of the waveguide by the use of a process for increasing adhesive strength which pertains to the state of the art and is described, for example, in WO 89/01957. Also in this case, the waveguide property remains preserved at low losses.

Preferably, the optical diffraction grating is embossed directly into the surface of the organic substrate by means of a forming process, e.g. hot stamping. In particular, an economical manufacture of the waveguide according to this invention can be expected if a synthetic resin film is utilized as the substrate, and the texturing of the substrate surface can be done in one film passage. In this connection, the roller-type embossing of synthetic resin films has proven itself especially well since it leads additionally also to a smoothing of the substrate surface.

Plastic films, on account of their manufacturing process, frequently exhibit striae and have too great a surface roughness of in most cases more than 3 nm RMS. Supposedly, this is one of the reasons why the use of plastic films as a substrate for waveguide layers is unknown. Although it is possible, in principle, for a film manufacturer to produce also films having the required roughness, with the use of especially smooth rolls. However, inasmuch as the need for such extremely smooth films is small and special production of these films is very expensive, a different procedure is recommended.

It has been found that the use of the conventional roll embossing process for the production of gratings on plastic films has a favorable effect on the production of high-quality substrate surfaces. It has been discovered surprisingly that it is possible to obtain, for a waveguide according to this invention, by roll embossing not only the gratings required for the coupling-in and coupling-out operations, but also a smoother surface having a roughness of <1.5 nm (RMS) in an intermediate range intended for waveguide purposes, if correspondingly high-quality metal shims are utilized.

Another process for producing an optical diffraction grating is photo-texturing. For this purpose, a polymer suitable for photo-texturing, e.g. a photoresist based on polyimide, is utilized, or a plastic, the index of refraction of which is variable photochemically. Such synthetic resins are described, for example, in Driemele et al., Appl. Opt. 25:2960 et seq., Hornak et al., J. Appl. Phys. 67 (1990), and Beeson et al., Appl. Phys. Lett. 58 (1991):1955 et seq.

The optical diffraction grating is produced in this process by exposing defined regions on the substrate surface whereby a local, photochemical change of the substrate material is induced. When using photoresist, the exposure step is followed by a developing step, generating a microrelief grating in the substrate surface. When using a plastic having a photochemically variable refractive index, the local exposure produces a refractive index modulation in a plane in parallel to the substrate surface.

Another process for producing an optical diffraction grating is the embossing of a polymer film which is crosslinked by exposure to light (especially by exposure to UV light) and thus is cured.

However, it can also be advantageous to arrange for the optical diffraction grating to have its own "grating layer" rather than to apply the grating directly in the substrate surface. This procedure is expedient, for example, in case the diffraction grating is not to be provided as a relief grating on the substrate surface but rather is to be fashioned as a layer with a periodically changing index of refraction. The diffraction grating can be produced in such a layer, which can consist of a photorefractive material, for example of a polymer, the refractive index of which can be altered by exposure to light, in a simple way as described above by means of a photolithographic process.

A further method for producing an optical diffraction grating is injection molding, described, for example, in A. Neyer et al., Proceedings of Integrated Photonics Research, 1992.

In case of the plastic layers produced from the liquid phase as well as in case of the ORMOCER layers, the optical diffraction gratings or the optical microstructures (strip waveguides) are preferably formed by plastic shaping. In this procedure, the film applied from the liquid phase is first dried. In this condition, it can still be shaped by the impression of a die. In the shaped condition, the film must then be cured, for instance by the effects of UV light or heat. The effect of UV can be applied, when using a transparent die, through the latter.

The intermediate layer of an organic material is preferably applied by a dipping or centrifugal method. It has been found that, when the intermediate layer has been formed from the liquid phase, the surface tension of the liquid leads to a more pronounced leveling of roughnesses on the substrate surface as well as the grating structure. In general, all methods are suited for producing the intermediate layer which yield compact layers devoid of column structures, for example, plasma-enhanced CVD processes, especially microwave plasma pulse CVD, or ion sputtering, inter alia. The PCVD method is preferred to produce an intermediate layer of $SiO_2$ since in this case the intermediate layer and the waveguide layer can be applied in one vacuum process.

The protective layer and the adhesion-promoting layer are formed, just as the waveguide layer, preferably likewise by means of a PCVD, especially PICVD process.

A waveguide according to this invention can be manufactured by a continuous film making process as well as batchwise in a PCVD facility with gas exchange system wherein, in succession, intermediate layer, adhesion-promoting and protective layer and waveguide layer are applied to the substrate provided with a grating structure. In an advantageous version of the process, the depth of the grating is predetermined by way of the layer thickness of the intermediate layer. This can be done by measuring the diffracting efficiency and/or the coupling-in or coupling-out efficiency of the grating structure. Measurement of the diffraction efficiency is here carried out prior to the coating step on the substrate equipped with the grating structure; the measurement of the coupling-in or coupling-out efficiency takes place during or after the coating procedure with which the waveguide layer is applied. This also makes it possible in a simple way to monitor the course of the process during the coating step and to effect adaptation to conditions changing during the coating process. For example, wearing down of the embossing shim for the roll embossing step, leading to an altered structural depth of the grating, can be recognized at an early point in time and can be compensated for up to a certain extent by changing the thickness of the intermediate layer, without interrupting the process.

Depending on the substrate material, it may be advantageous to protect the latter by means of a protective layer against radical attack from the plasma of the starting substances for the waveguide layer, e.g. Cl atoms. A layer thickness of a few nm is sufficient for this purpose.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents and publications, cited herein, and of corresponding German Application Nos. P 41 30 985.5, filed Sep. 18, 1991; P 42 13 454.4, filed Apr. 24, 1992; and P 42 28 853.3, filed Aug. 29, 1992, are hereby incorporated by reference.

The invention will be described in greater detail below with reference to the examples.

The coating operations were performed in a microwave PICVD facility as disclosed in Otto J. et al., Proceedings SPIE vol. 1323 (1990):39. The facility comprises a parallel-plate reactor with gas sprayer. The reaction gases were conducted into the reaction chamber through the gas sprayer. The substrate was disposed on a dielectric base plate transparent for microwaves (2.45 GHz). The waste gases of the process were exhausted radially by means of a pump.

I. Production of a monomode waveguide from $TiO_2$ on a polycarbonate substrate, the surface of which has been textured and/or smoothed by embossing in partial regions. The structure thus embossed is a grating with a line spacing of 364 nm and a modulating depth of 10 nm.

Process parameters:
  (a) Plasma Pretreatment
  Gas: $O_2$ and/or $N_2$ and/or Ar
  Duration: 5–300 s
  Pressure: 0.8 mbar
  Mass Flow: 100 ml/min
  Pulse Duration: 1 ms
  Pulse Interval: 90 ms
  (b) Coating
  Pressure: 0.8 mbar
  Mass Flow $TiCl_4$: 4 ml/min
  Mass Flow $O_2$: 100 ml/min
  Pulse Duration: 1 ms
  Pulse Interval: 90 ms
  Coating Rate: 40 nm/min
  Layer Thickness: 140 nm
  Substrate: polycarbonate, thickness 1.5 mm, diameter 100 mm
  Substrate Temperature: 60° C.

The coating operation was performed once with and once without application of the protective layer and/or the use of an adhesion-promoting method according to the state of the art. In both cases, the losses for TE0 waves were 2.5 dB/cm.

II. Production of a monomode waveguide from $TiO_2$ on a glass plate (AF45, thickness=0.55 mm, DESAG, Gruenenplan, FRG) coated with a thermoplastic polyimide film having a thickness of about 1 μm ("Mattimid" 5218, Ciba-Geigy, Basel, Switzerland). The substrate temperature during the coating step was 90° C..

Process Parameters:
  (a) Plasma Pretreatment
  Gas: $O_2$ and/or $N_2$ and/or Ar
  Duration: 5–300 s
  Pressure: 0.8 mbar
  Mass Flow: 100 ml/min
  Pulse Duration: 1 ms
  Pulse Interval: 90 ms
  (b) Coating 1: Protective Layer of $SiO_2$ (Layer Thickness: 13 nm)
  Pressure: 0.8 mbar
  Mass Flow HMDS*: 10 ml/min
  Mass Flow $O_2$: 90 ml/min
  Pulse Duration: 0.8 ms
  Pulse Interval: 90 ms
  Coating Rate: 150 nm/min
  (c) Coating 2: Waveguide of $TiO_2$ (Layer Thickness: 140 nm)
  Pressure: 0.8 mbar
  Mass Flow $TiCl_4$: 5 ml/min
  Mass Flow $O_2$: 95 ml/min
  Pulse Duration: 0.8 ms
  Pulse Interval: 90 ms
  Coating Rate: 47 nm/min
  Losses for TE0 Wave: 2.5 dB/cm
  *Hexamethyl disilazone III. Production of a monomode waveguide from $TiO_2$ on a plate of glass (AF45, thickness=0.55 mm DESAG) coated with a UV-curable ORMOCER Attention is invited to the appended paper by Klause Rose entitled, "Anorganisch-Organische Polymere als Beschichtungssysteme zur Verbesserung der mechanischen, chemischen und physikalischen Eigenschaften." Underlined portions relate in particular to UV-curable ORMOCER's.

Process Parameters:
  (a) Plasma Pretreatment
  Gas: $O_2$ and/or $N_2$ and/or Ar
  Duration: 5–300 s
  Pressure: 0.8 mbar
  Mass Flow: 100 ml/min
  Pulse Duration: 1 ms
  Pulse Interval: 90 ms
  (b) Coating
  Pressure: 0.8 mbar
  Mass Flow $TiCl_4$: 4 ml/min
  Mass Flow $O_2$: 100 ml/min
  Pulse Duration: 1 ms
  Pulse Interval: 90 ms
  Coating Rate: 40 nm/min
  Layer Thickness: 140 nm
  Substrate: ORMOCER layer, thickness 2 μm, on glass
  Substrate Temperature: 120° C.
  Losses for TE0 wave: 5 dB/cm IV. Production of a monomode waveguide from $TiO_2$ on a textured polycarbonate substrate as in Example I with an intermediate layer of $SiO_2$ having a thickness of 50 nm Process Parameters, Intermediate Layer:
  Pressure: 0.8 mbar
  Mass Flow HMDS: 10 ml/min
  Mass Flow $O_2$: 90 ml/min
  Pulse Duration: 0.8 ms
  Pulse Interval: 90 ms
  Coating Rate: 150 nm/min
  (Plasma pretreatment, application of waveguide layer, grating structure analogously to Example I.)

On account of the additional application of the intermediate layer, the propagation path of the conducted TM0 mode in the structured region of 0.5 mm (without intermediate layer) increased to 5 mm.

All of the coatings resulting from the above examples are free of cracks, show adhesive strength (according to MIL-M-13508-C), and withstand several days of storage at 45° C. and 100% relative humidity, as well as in water at 25° C.. Coated polycarbonate films likewise withstand without damage 30 temperature cycles between room temperature and 96° C., the coated side being continuously in contact with distilled water.

Exemplary embodiments of the invention will be described in greater detail below with reference to the figures wherein.

Figure 1:
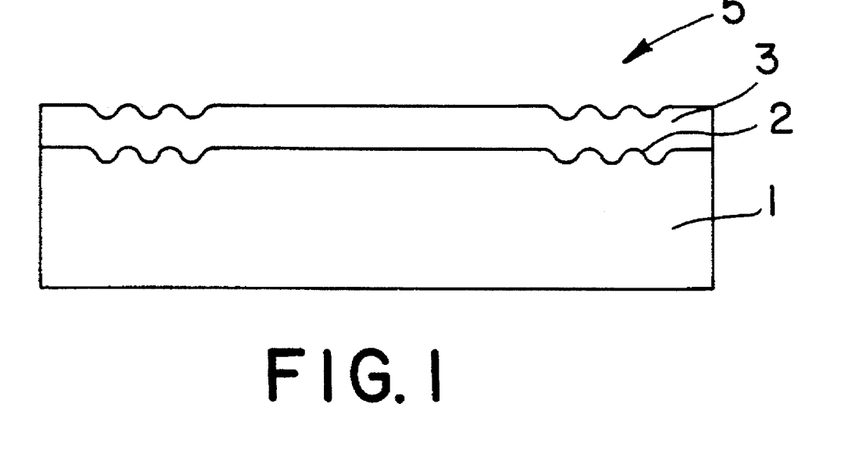
FIG. 1 shows a section through a planar optical waveguide.

In FIG. 1, a sectional view is illustrated of a planar optical waveguide 5 exhibiting a synthetic resin substrate 1. Prior to application of the waveguide layer 3, gratings 2 have been stamped on the substrate surface at two spaced-apart locations.

Figure 2:
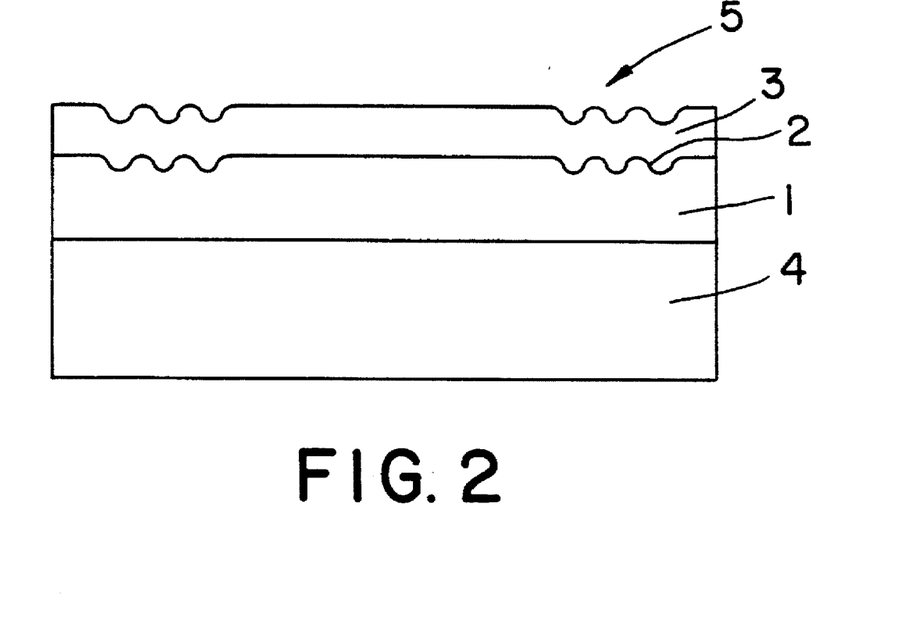
FIG. 2 shows a section through a planar optical waveguide with a polyimide or ORMOCER layer on a backing plate.

FIG. 2 shows another embodiment of the planar optical waveguide 5. On an additional backing plate 4, an ORMOCER layer 1 is applied as the substrate, and two gratings 2 are likewise embossed therein. The waveguide layer 3 is applied to the ORMOCER layer 1.

Figure 3:
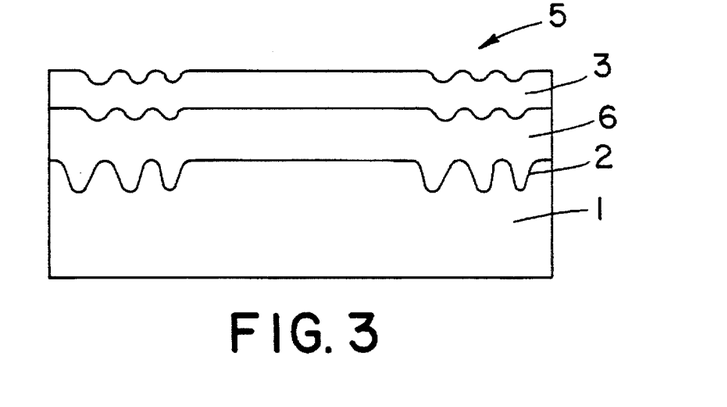
FIG. 3 shows a section through a planar optical waveguide with an intermediate layer.

An embodiment with an intermediate layer 6 is illustrated in FIG. 3. It can be seen that the intermediate layer leads to a smoothing of the optical diffraction grating and thus to a lessening of the structural depth.

Figure 4:
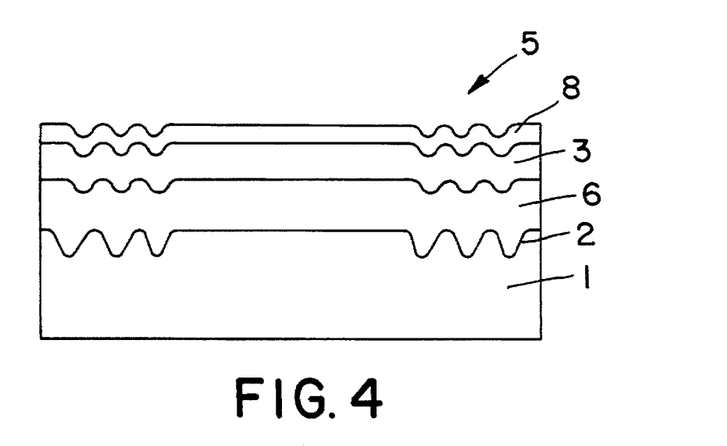
FIG. 4 shows a section through a planar waveguide with a cover layer.

In FIG. 4, the planar optical waveguide 5 is coated on the waveguide layer 3 additionally with a cover layer 8.

Figure 5:
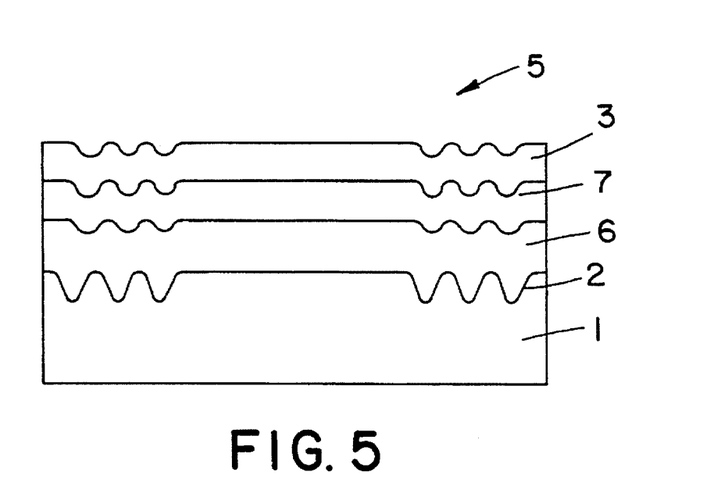
FIG. 5 shows a section through a planar optical waveguide according to another embodiment of the invention.

FIG. 5 shows that a protective and adhesion-promoting layer 7 is arranged between the intermediate layer 6 consisting of an organic material and the inorganic waveguide layer 3.

The preceding examples can be repeated with similar success by substituting the generically specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for the production of an optical waveguide, said optical waveguide comprising a substantially planar substrate having a top surface, said substrate being a synthetic resin substrate or a substrate having a high organic proportion, and an inorganic waveguide layer wherein, during operation, light propagates through said waveguide layer, said process comprising:

optionally applying at least one intermediate layer onto said top surface of said substrate, heating said synthetic resin substrate to a temperature less than the glass transition temperature of said synthetic resin substrate or heating said substrate having an organic proportion to a temperature less than 300° C., and applying said inorganic waveguide layer, by plasma chemical vapor deposition, directly to said top surface of said substrate or onto the surface of said at least one intermediate layer positioned on said top surface of said substrate, wherein said substrate having a high organic proportion contains hydrocarbon groups and metallic ions of metal oxides, and the ratio of the number of said hydrocarbon groups to the number of said metallic ions of metal oxides is greater than 0.1.

2. A process according to claim 1, further comprising providing said top surface of said substrate with at least one optical diffraction grating prior to application of said inorganic waveguide layer.

3. A process according to claim 2, wherein said optical diffraction grating is embossed by means of a shaping process into said top surface of said substrate.

4. A process according to claim 3, wherein a thermoplastic material is utilized as said substrate and said optical diffraction grating is produced by hot stamping.

5. A process according to claim 4, wherein a synthetic resin film is utilized as said substrate and said optical diffraction grating is produced on the top surface of said synthetic resin film by means of a continuous roll embossing process.

6. A process according to claim 2, wherein said optical diffraction grating is produced by a photochemical process.

7. A process according to claim 1, wherein said at least one intermediate layer is applied to said top surface of said substrate prior to application of said waveguide layer to smooth said surface of said substrate.

8. A process according to claim 7, wherein said intermediate layer is applied by means of a dipping or centrifugal process.

9. A process according to claim 7, wherein said intermediate layer is applied by means of a plasma chemical vapor deposition process.

10. A process according to claim 1, further comprising providing said surface of said substrate with at least one optical diffraction grating having a modulation depth prior to application of said inorganic waveguide layer and subsequently said at least one intermediate layer is applied to said surface, prior to application of said waveguide layer, to reduce the modulation depth of said optical diffraction grating.

11. A process according to claim 10, further comprising, before application of said at least one intermediate layer, measuring: diffraction efficiency of said optical diffraction grating, coupling-in efficiency of said optical diffraction grating, coupling-out efficiency of said optical diffraction grating, or combinations thereof.

12. A process according to claim 10, wherein said intermediate layer is applied by means of a dipping or centrifugal process.

13. A process according to claim 10, wherein said intermediate layer is applied by means of a plasma chemical vapor deposition process.

14. A process according to claim 10, wherein said intermediate layer is applied by means of a plasma impulse chemical vapor deposition process.

15. A process according to claim 10, further comprising, after application of said at least one intermediate layer, measuring: diffraction efficiency of said optical diffraction grating, coupling-in efficiency of said optical diffraction grating, coupling-out efficiency of said optical diffraction grating, or combinations thereof.

16. A process according to claim 1, wherein said substrate and said inorganic waveguide layer are chemically incompatible and said intermediate layer is applied to said top surface of said substrate prior to application of said waveguide layer for promoting adhesion between said substrate and said inorganic waveguide layer.

17. A process according to claim 1, wherein said intermediate layer is applied to said top surface of said substrate prior to application of said inorganic waveguide layer, said intermediate layer being a protective layer for protecting said substrate against attack of energy particles from plasma during application of said inorganic waveguide layer.

18. A process according to claim 1, wherein, during application of said inorganic waveguide layer, plasma is excited by means of microwaves.

19. A process according to claim 1, wherein said inorganic waveguide layer is applied by a plasma impulse chemical vapor deposition process.

20. A process according to claim 1, wherein said substrate is heated to a temperature of >60° C. prior to application of said inorganic waveguide layer.

21. A process according to claim 7, wherein said intermediate layer is applied by means of a plasma impulse chemical vapor deposition process.

22. A process according to claim 1, wherein said substrate is a substrate having an organic portion wherein the ratio of the concentration of hydrocarbon groups to the concentration of metallic atoms is >0.1.

23. A process according to claim 1, wherein said substrate is a synthetic resin substrate having a thickness of >20 μm.

24. A process according to claim 1, wherein said substrate is an organically modified ceramic substrate.

25. A process according to claim 1, wherein said substrate has a thickness of 20 μm–2 mm.

26. A process according to claim 1, wherein said inorganic waveguide layer is made of $TiO_2$, ZnO, $Nb_2O_5$, $Si_3N_4$, $Ta_2O_5$, $HfO_2$, $ZrO_2$, or a mixture of $TiO_2$ and $SiO_2$.

27. A process according to claim 1, wherein said inorganic waveguide layer exhibits an attenuation of <5 dB/cm.

28. A process according to claim 7, wherein said intermediate layer is a layer of $SiO_2$; F-doped $SiO_2$; B-doped $SiO_2$; $SiO_xC_yH_z$ wherein x is 1, y is 1–2 and z is 2–6 at the surface of said substrate and x is 2, y is 0 and z is 0 adjacent said inorganic waveguide layer; $Al_2O_3$; or an organically modified ceramic layer.

29. A process according to claim 7, further comprising arranging an adhesion-promoting layer between said intermediate layer and said inorganic waveguide layer.

30. A process according to claim 17, wherein said protective layer has a thickness of 1 nm–200 nm.

31. A process according to claim 30, wherein said protective layer is a $SiO_2$ layer.

32. A process according to claim 1, further comprising applying a covering layer of $SiO_2$ or polystyrene onto said inorganic waveguide layer.

33. A process according to claim 1, wherein said optical waveguide is a strip waveguide wherein said strip waveguide exhibits a strip-shaped optical microstructure.

34. A process according to claim 33, wherein said strip-shaped optical microstructure of said strip waveguide exhibits a raised profile formed by plastic or thermoplastic shaping or photochemically.

35. A process according to claim 33, wherein said strip-shaped optical microstructure of said strip waveguide exhibits refractive index modulation in parallel to said surface of said substrate obtained photochemically.

* * * * *